US012629983B2

(12) United States Patent
Yin

(10) Patent No.: US 12,629,983 B2
(45) Date of Patent: May 19, 2026

(54) DEVICE COOLING SYSTEM AND THERMAL MANAGEMENT SYSTEM

(71) Applicant: Shenzhen Yinwang Intelligent Technologies Co., Ltd., Shenzhen (CN)

(72) Inventor: Jianqiang Yin, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 185 days.

(21) Appl. No.: 18/413,050

(22) Filed: Jan. 16, 2024

(65) Prior Publication Data

US 2024/0149637 A1 May 9, 2024

Related U.S. Application Data

(63) Continuation of application No. PCT/CN2021/115796, filed on Aug. 31, 2021.

(51) Int. Cl.
B60H 1/00 (2006.01)

(52) U.S. Cl.
CPC ..... B60H 1/00785 (2013.01); B60H 1/00899 (2013.01)

(58) Field of Classification Search
CPC ............ B60H 1/00785; B60H 1/00899; B60H 1/00278; B60H 2001/00307; B60H 1/32; B60K 11/02; H05K 7/20945
See application file for complete search history.

(56) References Cited

U.S. PATENT DOCUMENTS

| | | | |
|---|---|---|---|
| 9,680,190 B1 * | 6/2017 | Xia | H01M 10/6557 |
| 10,479,170 B2 * | 11/2019 | Enomoto | B60H 1/00428 |
| 2015/0380785 A1 | 12/2015 | Takeuchi et al. | |
| 2018/0178615 A1 * | 6/2018 | Xia | H01M 10/486 |

* cited by examiner

*Primary Examiner* — Lionel Nouketcha
(74) *Attorney, Agent, or Firm* — Leydig, Voit & Mayer, Ltd.

(57) ABSTRACT

A device cooling system includes a vehicle-mounted device, a main controller, and a valve set. A liquid inlet pipe and a liquid outlet pipe are disposed on the vehicle-mounted device, the liquid inlet pipe is connected to the valve set, the valve set is connected to an electric drive liquid-cooling loop to form a first path, the valve set is connected to a battery liquid-cooling loop to form a second path, and the valve set is configured to switch a switch status to control to connect the first path or the second path. A temperature and humidity detection apparatus is disposed in the vehicle-mounted device. The main controller is configured to: obtain a dew point temperature based on a temperature and humidity that are detected by the temperature and humidity detection apparatus, and control, based on the dew point temperature, the valve set to switch the switch status.

20 Claims, 6 Drawing Sheets

52                                                      51

53

54

DEVICE COOLING SYSTEM AND THERMAL MANAGEMENT SYSTEM

CROSS-REFERENCE TO RELATED APPLICATION

This application is a continuation of International Application No. PCT/CN2021/115796, filed on Aug. 31, 2021, the disclosure of which is hereby incorporated by reference in its entirety.

TECHNICAL FIELD

This application relates to the field of thermal management technologies, and in particular, to a device cooling system and a thermal management system.

BACKGROUND

Condensation is a phenomenon that absolute humidity in air remains unchanged and an air temperature decreases, humidity in the air reaches saturation when the temperature decreases to a specific value, and moisture in the air is precipitated when the temperature continues to decrease. A dew point temperature is a temperature at which relative humidity in the air can reach 100% on the premise that a humidity ratio and atmospheric pressure remain unchanged. Dew attached to a device may cause defect phenomena such as electrochemical corrosion and mildewing. The dew dripping onto an electrical component of the device may cause problems such as a short circuit and explosion.

The vehicle field is used as an example. As a function of a vehicle-mounted device is increasingly powerful, power consumption of a chip in the vehicle-mounted device is increasingly high. Therefore, a heat dissipation requirement on the vehicle-mounted device is increasingly high, and the heat dissipation requirement cannot be met through only natural heat dissipation or air-cooling heat dissipation. To improve heat dissipation efficiency, the vehicle-mounted device may be connected to a liquid-cooling circulation system in a vehicle. However, a temperature difference between the air and coolant in the liquid-cooling circulation system is large. Consequently, condensation may occur when hot air inside the vehicle-mounted device encounters a cold housing of the vehicle-mounted device, causing risks of corrosion and a short circuit that occur in a mainboard and an electronic component in the vehicle-mounted device.

SUMMARY

Embodiments of this application provide a device cooling system and a thermal management system, to resolve a problem that condensation occurs when a device is connected to a liquid-cooling circulation system. When the solution is applied to a vehicle system, a risk of condensation occurring in a vehicle-mounted device can be reduced, and vehicle safety can be improved.

An aspect of embodiments of this application provides a device cooling system, applied to a thermal management system. The thermal management system includes an electric drive liquid-cooling loop and a battery liquid-cooling loop. The device cooling system includes a vehicle-mounted device, a main controller, and a valve set. A liquid inlet pipe and a liquid outlet pipe are disposed on the vehicle-mounted device, the liquid inlet pipe is connected to the valve set, the valve set is connected to the electric drive liquid-cooling loop to form a first path, the valve set is connected to the battery liquid-cooling loop to form a second path, the valve set is configured to switch a switch status to control to connect the first path or the second path, and the liquid outlet pipe is connected to the electric drive liquid-cooling loop or the battery liquid-cooling loop. A temperature and humidity detection apparatus is disposed in the vehicle-mounted device. The main controller is separately connected to the temperature and humidity detection apparatus and the valve set, and the main controller is configured to: obtain a dew point temperature based on a temperature and humidity that are detected by the temperature and humidity detection apparatus, and control, based on the dew point temperature, the valve set to switch the switch status.

According to the device cooling system provided in embodiments of this application, the temperature and humidity detection apparatus is disposed in the vehicle-mounted device to obtain the dew point temperature of air inside the vehicle-mounted device. The vehicle-mounted device is connected to the electric drive liquid-cooling loop and the battery liquid-cooling loop by using the valve set. The vehicle-mounted device is connected to the electric drive liquid-cooling loop or the battery liquid-cooling loop by switching a switch by using the valve set. In this way, a temperature of coolant entering the vehicle-mounted device is always higher than or equal to the dew point temperature of the air inside the vehicle-mounted device. This can avoid a condensation phenomenon occurring in the vehicle-mounted device, and improve and prolong reliability and a service life of the vehicle-mounted device.

In a possible implementation, a first temperature sensor is disposed between the electric drive liquid-cooling loop and the valve set, and a second temperature sensor is disposed between the battery liquid-cooling loop and the valve set. The main controller is separately connected to the first temperature sensor and the second temperature sensor. The main controller is configured to: obtain a first temperature detected by the first temperature sensor and a second temperature detected by the second temperature sensor; compare the dew point temperature, the first temperature, and the second temperature; and when both the first temperature and the second temperature are higher than or equal to the dew point temperature, control to connect a path corresponding to a lower temperature in the first temperature and the second temperature; or when either of the first temperature and the second temperature is higher than or equal to the dew point temperature, control to connect a path corresponding to a higher temperature in the first temperature and the second temperature.

In this case, liquid inlet temperatures of the electric drive liquid-cooling loop and the battery liquid-cooling loop may be compared with the dew point temperature, so that the temperature of the coolant entering the vehicle-mounted device can be controlled more accurately. This can avoid the condensation phenomenon occurring in the vehicle-mounted device, and the vehicle-mounted device can be at a lowest working temperature, to improve reliability of the vehicle-mounted device and reduce a failure rate.

In a possible implementation, the device cooling system further includes a first heater. The first heater is connected between the valve set and the liquid inlet pipe, the main controller is connected to the first heater, and the main controller is configured to: when both the first temperature and the second temperature are lower than the dew point temperature, control the first heater to be turned on.

The first heater is disposed to heat water with a low temperature from the battery liquid-cooling loop or the electric drive liquid-cooling loop. In this way, a temperature of water entering the vehicle-mounted device is higher than or equal to the dew point temperature, so that a condensation phenomenon can be avoided.

In a possible implementation, the device cooling system further includes a third temperature sensor. The third temperature sensor may be connected between the first heater and the liquid inlet pipe, and the main controller is connected to the third temperature sensor. The main controller is configured to: obtain a third temperature detected by the third temperature sensor, and control the first heater to be turned on, so that the third temperature is not lower than the dew point temperature.

The third temperature sensor is disposed, so that the temperature of the water entering the vehicle-mounted device may be monitored in real time. This ensures that the temperature of the water entering the vehicle-mounted device is higher than or equal to the dew point temperature, and avoids affecting cooling efficiency and working reliability of the vehicle-mounted device due to an excessively high temperature of water caused by excessive heating power of the first heater.

In a possible implementation, the valve set includes a first three-way solenoid valve. The liquid inlet pipe is connected to an outlet of the first three-way solenoid valve, the electric drive liquid-cooling loop is connected to a first inlet of the first three-way solenoid valve, and the battery liquid-cooling loop is connected to a second inlet of the first three-way solenoid valve.

The two inlets of the first three-way solenoid valve are switched to open, so that the liquid inlet pipe can be switched to be connected to the two loops in a case in which there are a small quantity of components and a pipeline is simple.

In a possible implementation, the valve set includes a first two-way solenoid valve and a second two-way solenoid valve. The first two-way solenoid valve is connected between the electric drive liquid-cooling loop and the liquid inlet pipe, and the second two-way solenoid valve is connected between the battery liquid-cooling loop and the liquid inlet pipe.

The two two-way solenoid valves are disposed, so that same functions of the two two-way solenoid valves as that of one three-way solenoid valve can be implemented. In addition, a pipeline connection relationship is simple and easy to implement.

In a possible implementation, the vehicle-mounted device includes a housing and a mainboard disposed in the housing. The housing includes a cold plate, and the liquid inlet pipe and the liquid outlet pipe are disposed on the cold plate.

The cold plate disposed on the vehicle-mounted device can be used to implement connections between the vehicle-mounted device and the liquid-cooling loops, to implement liquid-cooling of the vehicle-mounted device and better protect the mainboard.

In a possible implementation, the electric drive liquid-cooling loop includes a radiator, a first tank, a first water pump, and a powertrain that are sequentially connected through a pipeline, and the valve set is connected between the first water pump and the powertrain.

In this way, the low-temperature coolant in the electric drive liquid-cooling loop can enter the vehicle-mounted device.

In a possible implementation, the electric drive liquid-cooling loop further includes a second three-way solenoid valve, an inlet of the second three-way solenoid valve is connected to the powertrain, and two outlets of the second three-way solenoid valve are respectively connected to the radiator and the first tank.

The second three-way solenoid valve is disposed, so that when heat generated by the powertrain is low, a heat dissipation requirement can be met only through coolant circulation, and the radiator does not need to be turned on. This can reduce energy consumption.

In a possible implementation, the battery liquid-cooling loop includes a compressor, a heat exchanger, a condenser, a second tank, a second water pump, and a battery pack. The compressor, the heat exchanger, and the condenser are sequentially connected through a pipeline to form a refrigerant loop. The second tank, the second water pump, the heat exchanger, and the battery pack are sequentially connected through a pipeline to form a coolant loop. The valve set is connected between the heat exchanger and the battery pack.

In this way, the low-temperature coolant in the battery liquid-cooling loop can enter the vehicle-mounted device.

In a possible implementation, the battery liquid-cooling loop further includes a second heater. The second heater is connected between the heat exchanger and the battery pack, and the valve set is connected between the second heater and the battery pack.

The second heater is configured to heat the coolant, to heat the battery pack when a temperature is low in winter, to prevent the low temperature from affecting working of the battery pack.

In a possible implementation, the vehicle-mounted device includes a domain controller, an on-board charger, or an electronic control unit ECU.

A plurality of types of vehicle-mounted devices may be all used in the foregoing cooling system to implement efficient cooling and anti-condensation.

In a possible implementation, the main controller is a vehicle control unit VCU or a controller in the vehicle-mounted device.

The main controller may be integrated in the vehicle control unit to make vehicle integration higher, or the main controller may be a controller included in the vehicle-mounted device to facilitate circuit connection.

Another aspect of embodiments of this application provides a thermal management system. The thermal management system includes an electric drive liquid-cooling loop, a battery liquid-cooling loop, and the foregoing device cooling system.

In the thermal management system in embodiments of this application, the electric drive liquid-cooling loop and the battery liquid-cooling loop are disposed to respectively cool two main heat generation devices: a powertrain and a battery pack. In addition, a vehicle-mounted device may be connected to the electric drive liquid-cooling loop or the battery liquid-cooling loop under control of a main controller. In this way, liquid-cooling of the vehicle-mounted device can be implemented, and a condensation phenomenon in the vehicle-mounted device can be avoided.

Another aspect of embodiments of this application further provides a method for controlling a device cooling system. The method includes:

obtaining temperature information and humidity information that are detected by a temperature and humidity detection apparatus in a vehicle-mounted device, and calculating a dew point temperature based on the temperature information and the humidity information;
    determining whether the dew point temperature falls within a first interval or a second interval; and if the dew point temperature falls within the first interval, controlling a valve set to switch a switch to open a first path, where the first path connects the vehicle-mounted device with an electric drive liquid-cooling loop; or if the dew point temperature falls within the second interval, controlling a valve set to switch a switch to open a second path, where the second path connects the vehicle-mounted device with a battery liquid-cooling loop.

Through analysis for the dew point temperature, when the dew point temperature falls within different intervals, the vehicle-mounted device can be controlled to be connected to different liquid-cooling loops, so that a temperature of coolant entering the vehicle-mounted device is always higher than or equal to the dew point temperature of air inside the vehicle-mounted device. This can avoid a condensation phenomenon occurring in the vehicle-mounted device.

In a possible implementation, the determining whether the dew point temperature falls within a first interval or a second interval includes:

obtaining a first temperature detected by a first temperature sensor and a second temperature detected by a second temperature sensor, where the first temperature is a liquid inlet temperature of the first path, and the second temperature is a liquid inlet temperature of the second path;

comparing the dew point temperature, the first temperature, and the second temperature; and when the dew point temperature is lower than or equal to either of the first temperature and the second temperature, if the first temperature is higher than the second temperature, determining that the dew point temperature falls within the first interval; or if the first temperature is lower than the second temperature, determining that the dew point temperature falls within the second interval; or when the dew point temperature is lower than or equal to both the first temperature and the second temperature, if the first temperature is higher than the second temperature, determining that the dew point temperature falls within the second interval; or if the first temperature is lower than the second temperature, determining that the dew point temperature falls within the first interval.

Based on a result of comparison between respective liquid inlet temperatures of the two loops and the dew point temperature, the temperature of the coolant entering the vehicle-mounted device can be controlled more accurately, so that the condensation phenomenon is avoided.

In a possible implementation, the method for controlling a device cooling system further includes: determining whether the dew point temperature falls within a third interval; and if the dew point temperature falls within the third interval, controlling a first heater to be turn on, where the first heater is disposed between the valve set and the vehicle-mounted device.

When the dew point temperature is high and the condensation phenomenon cannot be avoided no matter whether the vehicle-mounted device is connected to the electric drive liquid-cooling loop or the battery liquid-cooling loop, the coolant may be heated by using a heater, so that a liquid inlet temperature is higher than or equal to the dew point temperature.

In a possible implementation, the determining whether the dew point temperature falls within a third interval includes:

comparing the dew point temperature, the first temperature, and the second temperature, and if the dew point temperature is higher than both the first temperature and the second temperature, determining that the dew point temperature falls within the third interval.

Based on a result of comparison between respective liquid inlet temperatures of the two loops and the dew point temperature, it can be more accurately determined that the liquid inlet temperatures of the two loops both are lower than the dew point temperature, and then the heater is turned on in time, to prevent condensation.

An embodiment of this application further provides a device cooling system that is used in a thermal management system including two or more liquid-cooling loops. The thermal management system includes a first liquid-cooling loop and a second liquid-cooling loop. A cooling temperature of coolant in the first liquid-cooling loop is higher than a cooling temperature of coolant in the second liquid-cooling loop. The device cooling system includes a to-be-cooled device, a main controller, and a valve set. A liquid inlet pipe of the to-be-cooled device is connected to the valve set, the valve set is connected to the first liquid-cooling loop to form a first path, and the valve set is connected to the second liquid-cooling loop to form a second path. The valve set is configured to switch a switch status to control to connect the first path or the second path. A liquid outlet pipe of the to-be-cooled device is connected to the first liquid-cooling loop and the second liquid-cooling loop. A temperature and humidity detection apparatus is disposed in the to-be-cooled device, and the main controller is separately connected to the temperature and humidity detection apparatus and the valve set. The main controller is configured to: obtain a dew point temperature based on a temperature and humidity that are detected by the temperature and humidity detection apparatus, and control, based on the dew point temperature, the valve set to switch the switch status. The device cooling system provided in this embodiment of this application may be used in the foregoing thermal management system in a vehicle, or used in the fields such as a power system and a data center.

According to the device cooling system, the thermal management system, and the method for controlling a device cooling system that are provided in embodiments of this application, the temperature and humidity detection apparatus is disposed in the vehicle-mounted device to obtain the dew point temperature of the air inside the vehicle-mounted device, the vehicle-mounted device is connected to the electric drive liquid-cooling loop and the battery liquid-cooling loop by using the valve set, and the vehicle-mounted device is connected to the electric drive liquid-cooling loop or the battery liquid-cooling loop by controlling the valve set to switch the switch. In this way, the temperature of the coolant entering the vehicle-mounted device is always higher than or equal to the dew point temperature of the air inside the vehicle-mounted device. This can avoid a condensation phenomenon occurring in the vehicle-mounted device, improve and prolong reliability and a service life of the vehicle-mounted device, to help improve reliability of the thermal management system in a vehicle.

DESCRIPTIONS OF REFERENCE NUMERALS

Figure 1:
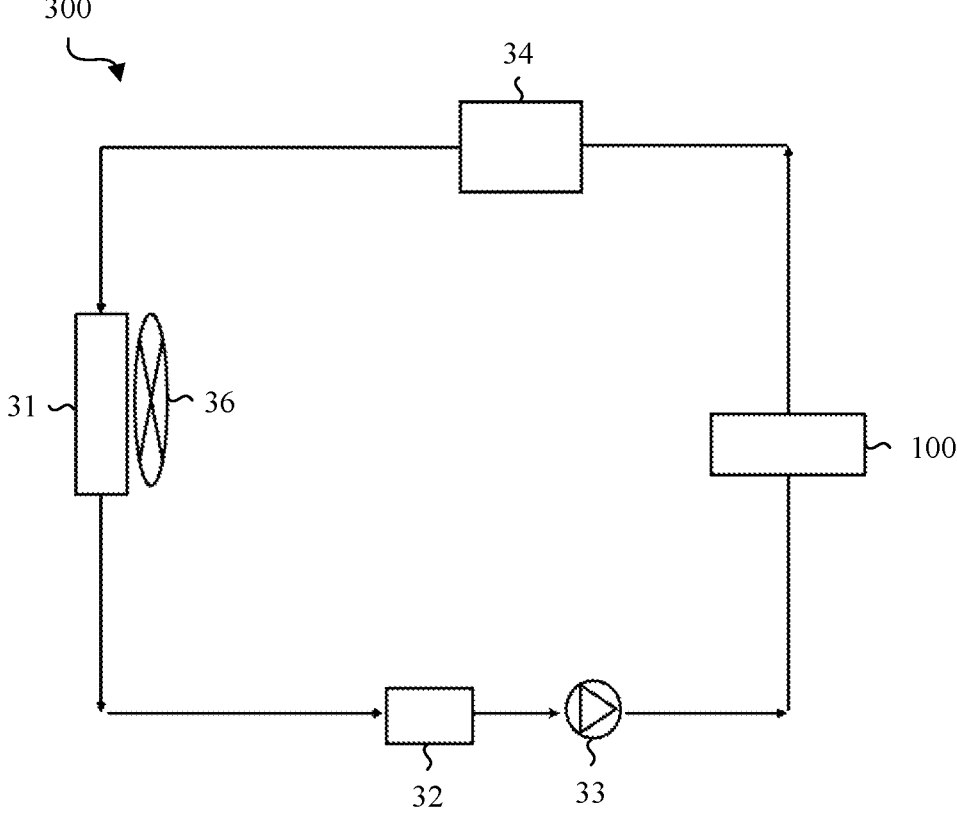
FIG. 1 is a schematic diagram of connecting a vehicle-mounted device to an electric drive liquid-cooling loop according to a conventional technology.

100: vehicle-mounted device; 11: housing; 111: upper housing; 112: lower housing; 113: liquid inlet pipe; 114: liquid outlet pipe; 12: mainboard; 13: connector; 200: first three-way solenoid valve; 201: first heater; 202: first two-way solenoid valve; 203: second two-way solenoid valve; 300: electric drive liquid-cooling loop; 31: radiator; 32: first tank; 33: first water pump; 34: powertrain; 35: second three-way solenoid valve; 36: first fan; 400: battery liquid-cooling loop; 41: compressor; 42: heat exchanger; 43: condenser; 44: second tank; 45: second water pump; 46: battery pack; 47: second heater; 48: second fan.

DESCRIPTION OF EMBODIMENTS

Embodiments of this application provide a thermal management system. The thermal management system is applied to an electric vehicle, and configured to perform thermal energy management on a vehicle system. The thermal management system may include two liquid-cooling circulation systems: an electric drive liquid-cooling loop and a battery liquid-cooling loop. A powertrain is connected to the electric drive liquid-cooling loop to cool the powertrain, and a battery pack is connected to the battery liquid-cooling loop to cool the battery pack.

In addition to the two main heat generation devices: the powertrain and the battery pack, a vehicle further includes a plurality of types of vehicle-mounted devices such as a domain controller (which may also be referred to as a mobile data center (MDC)), an on-board charger, and an electronic control unit (ECU). The vehicle-mounted device may be installed in an engine compartment, in a front passenger glove compartment, under a seat, or at another location of the electric vehicle. These locations require that the vehicle-mounted devices support a high ambient temperature. When a heat dissipation environment is harsh, and the vehicle-mounted device works, a temperature of a component increases, and an ambient temperature nearby also affect an internal temperature of the device. As a result, working reliability of the electronic component is affected. In the electronics industry, when an ambient temperature of the component increases by 10° C., a failure rate of the electronic component usually doubles. To ensure normal working of the vehicle-mounted devices and smooth operation of the vehicle, heat dissipation of these vehicle-mounted devices also needs to be considered. Therefore, the thermal management system may further include a device cooling system.

In a conventional technology, the vehicle-mounted device may support natural heat dissipation or air-cooled heat dissipation. The vehicle-mounted device may include a housing of a radiator and a mainboard disposed inside the housing of the radiator. A chip and another electronic component are disposed on the mainboard. Heat generated by the mainboard, the chip, and the another electronic component may be transferred to the housing of the radiator through radiation and convection. A plurality of heat dissipation fins are disposed on the housing of the radiator, and the heat transferred to the heat dissipation fins may be dissipated into outside air through radiation and convection.

However, as a function of the vehicle-mounted devices are increasingly powerful, computing power of the chip increases accordingly, power consumption of the chip also increases, and a heat dissipation requirement is increasingly high. A computing device is used as an example. As an autonomous driving level continuously increases, a requirement on computing power of the domain controller continuously increases. For example, a quantity of operations needs to be increased from 10 Tflops to 300 Tflops or even higher. Consequently, power consumption of a domain controller system increases, for example, increases from 20 W to 300 W. As a result, the domain controller cannot meet a heat dissipation requirement of a high-power controller through natural heat dissipation or air-cooled heat dissipation. Therefore, it is necessary to design the domain controller to dissipate the heat through liquid-cooling.

In a conventional technology, the vehicle-mounted device may be connected to the electric drive liquid-cooling loop or the battery liquid-cooling loop, to implement liquid-cooling heat dissipation of the vehicle-mounted device.

FIG. 1 is a schematic diagram of connecting a vehicle-mounted device to an electric drive liquid-cooling loop according to a conventional technology. As shown in FIG. 1, the electric drive liquid-cooling loop 300 may include a radiator 31, a first tank 32, a first water pump 33, a powertrain 34, and a first fan 36. The radiator 31, the first tank 32, the first water pump 33, and the powertrain 34 may be sequentially connected through a pipeline to form a loop, and coolant like water may circulate in the loop. Heat generated by the powertrain 34 is taken away by the coolant and dissipated at the radiator 31. The first fan 36 may be disposed close to the radiator 31, to improve heat dissipation efficiency of the radiator 31.

The vehicle-mounted device 100 may be connected between the first water pump 33 and the powertrain 34, so that the coolant like the water in the electric drive liquid-cooling loop 300 can dissipate heat for the vehicle-mounted device 100. However, a temperature of water in the electric drive liquid-cooling loop 300 is usually higher than 40° C., or may even reach 65° C. When the temperature of the water in the electric drive liquid-cooling loop 300 is high, a cooling effect on the vehicle-mounted device 100 is limited. In addition, when a high ambient temperature is maintained, a failure rate of an electronic component in the vehicle-mounted device 100 may increase.

Figure 2:
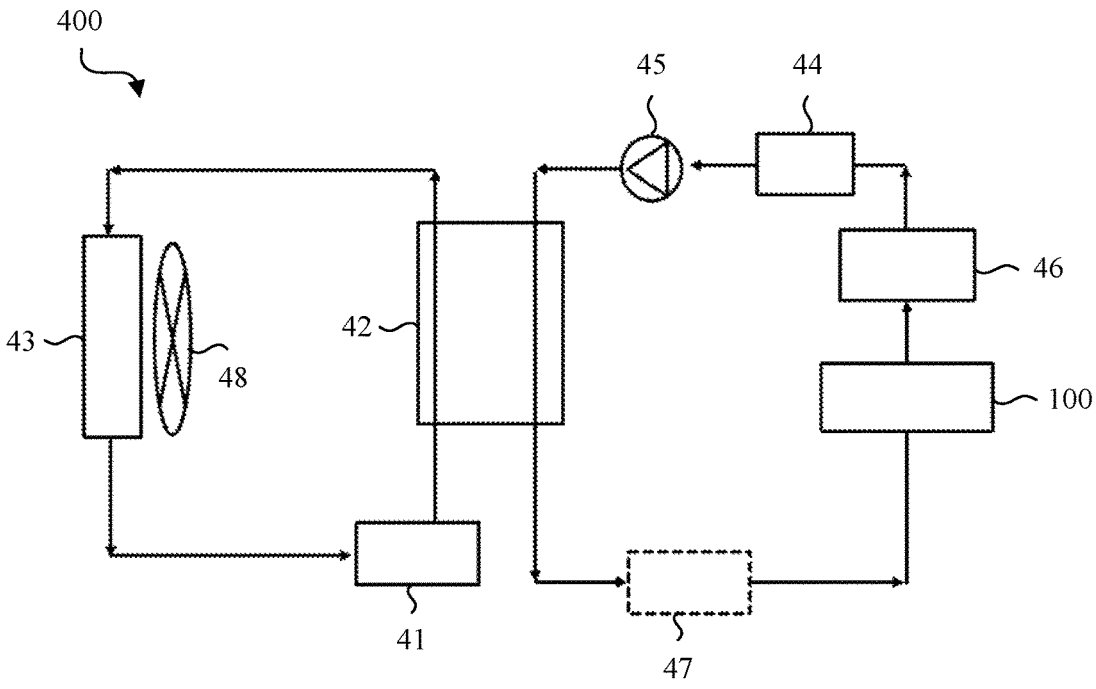
FIG. 2 is a schematic diagram of connecting a vehicle-mounted device to a battery liquid-cooling loop according to a conventional technology.

FIG. 2 is a schematic diagram of connecting a vehicle-mounted device to a battery liquid-cooling loop according to a conventional technology. As shown in FIG. 2, the battery liquid-cooling loop 400 may include a compressor 41, a heat exchanger 42, a condenser 43, a second tank 44, a second water pump 45, a battery pack 46, and a second fan 48. The compressor 41, the heat exchanger 42, and the condenser 43 may be sequentially connected through a pipeline to form a loop, and refrigerant may circulate in the loop. The heat exchanger 42, the second tank 44, the second water pump 45, and the battery pack 46 may be sequentially connected through a pipeline to form a loop, and coolant like the water may circulate in the loop. Heat generated by the battery pack 46 may be taken away by the coolant like the water, the heat is exchanged at the heat exchanger 42, and the refrigerant is condensed at the condenser 43 for heat dissipation. The second fan 48 may be disposed close to the condenser 43, to improve heat dissipation efficiency of the condenser 43.

The vehicle-mounted device 100 may be connected between the heat exchanger 42 and the battery pack 46, so that the coolant like the water in the battery liquid-cooling loop 400 can dissipate heat for the vehicle-mounted device 100. However, a temperature of water in the battery liquid-cooling loop 400 is usually about 20° C. In summer, an ambient temperature for installing and deploying the vehicle-mounted device 100 is usually about 40° C. There is a temperature difference of 20° C. between the temperature of the water and the ambient temperature. When hot air in the vehicle-mounted device 100 encounters a housing wall of a cold device, condensation may occur. The condensation may cause risks of corrosion and a short circuit that occur in a board component. Consequently, a board is faulty.

To resolve a problem that condensation occurs after the vehicle-mounted device 100 is connected to a liquid-cooling system, a waterproof vehicle-mounted device 100 may be customized. The vehicle-mounted device 100 may include an upper housing, a lower housing, and a connector. Waterproof sealant is directly dispensed to a mechanical part of the lower housing and the connector, and the upper housing and the lower housing are assembled together by using a screw before the waterproof sealant is solidified. After the waterproof sealant is completely solidified, a complete adhesive force may be formed to bond and seal the upper housing, the lower housing, and the connector together, to implement a waterproof function between the connector and a cable and between the connector and a housing of the device. In this way, the vehicle-mounted device 100 can implement a waterproof requirement of IP67 or above as a whole, to prevent moisture entering and delay condensation occurring. However, the moisture isolation solution has a long-term reliability risk, and the waterproof sealant may fail to seal the device. In addition, if the waterproof sealant is used for a long time, moisture inside and outside the vehicle-mounted device 100 is finally balanced, and then a condensation phenomenon occurs.

In another possible implementation, a design of dispensing or coating on a surface of the mainboard in the vehicle-mounted device 100 is used. This can prevent component corrosion and a short circuit caused by dew on the board. However, there are a series of problems such as low manufacturing efficiency, high costs, moisture-proof but not waterproof, and impact on heat dissipation of a component.

It should be noted that, a higher temperature in air indicates more water vapor that can be included in the air and higher saturation humidity. If the temperature in the air is reduced by maintaining humidity in the air, when the temperature is lower than a specific value, partial pressure of the water vapor reaches saturation pressure corresponding to a current temperature in the air. In this case, the water vapor in the air reaches saturation. If the temperature in the air is further reduced, the water vapor is condensed from the air, and this phenomenon is called condensation. A dew point temperature is a temperature at which the air is cooled to saturation without changing humidity and atmospheric pressure.

For the vehicle-mounted device 100, the condensation phenomenon occurs when internal humid and hot air encounters a surface of the housing whose temperature is lower than the dew point temperature. Therefore, a temperature of the coolant entering the vehicle-mounted device 100 is controlled to be always higher than or equal to the dew point temperature of air inside the vehicle-mounted device 100, so that the condensation phenomenon can be avoided.

Based on the foregoing problem, embodiments of this application provide a device cooling system. A temperature and humidity detection apparatus is disposed in the vehicle-mounted device to obtain the dew point temperature of the air inside the vehicle-mounted device, the vehicle-mounted device is connected to the electric drive liquid-cooling loop and the battery liquid-cooling loop by using a valve set, and the valve set switches a switch to enable the vehicle-mounted device to be connected to the electric drive liquid-cooling loop or the battery liquid-cooling loop. In this way, the temperature of the coolant entering the vehicle-mounted device is always higher than or equal to the dew point temperature of the air inside the vehicle-mounted device. This can avoid the condensation phenomenon occurring in the vehicle-mounted device, and improve and prolong reliability and a service life of the vehicle-mounted device.

Figure 3:
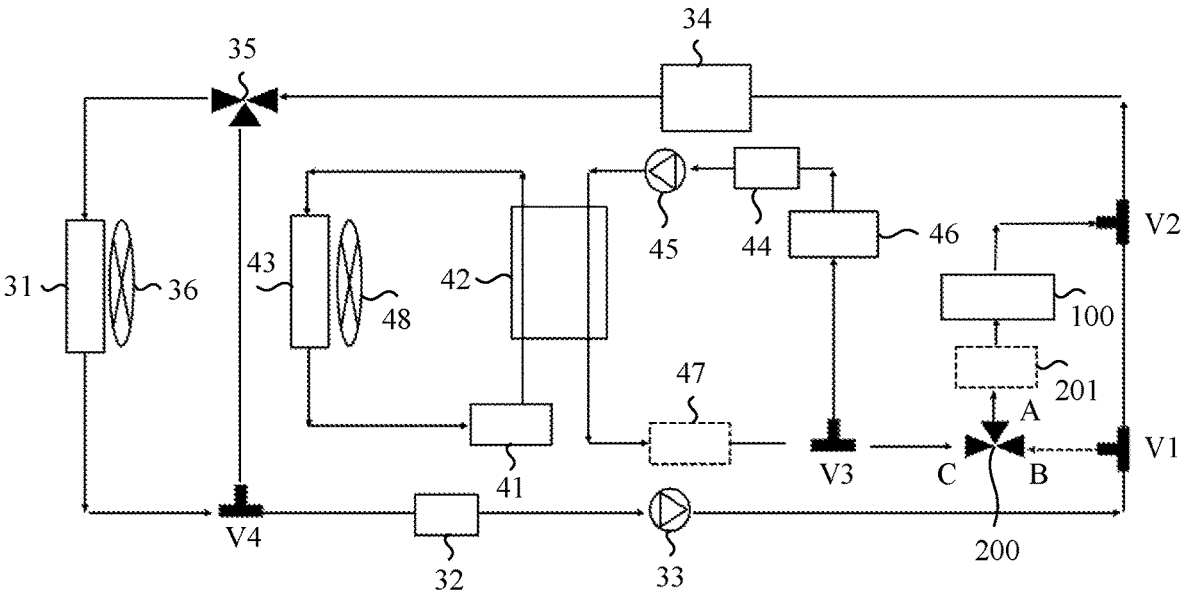
FIG. 3 is a schematic diagram of a device cooling system according to an embodiment of this application.
Figure 4:
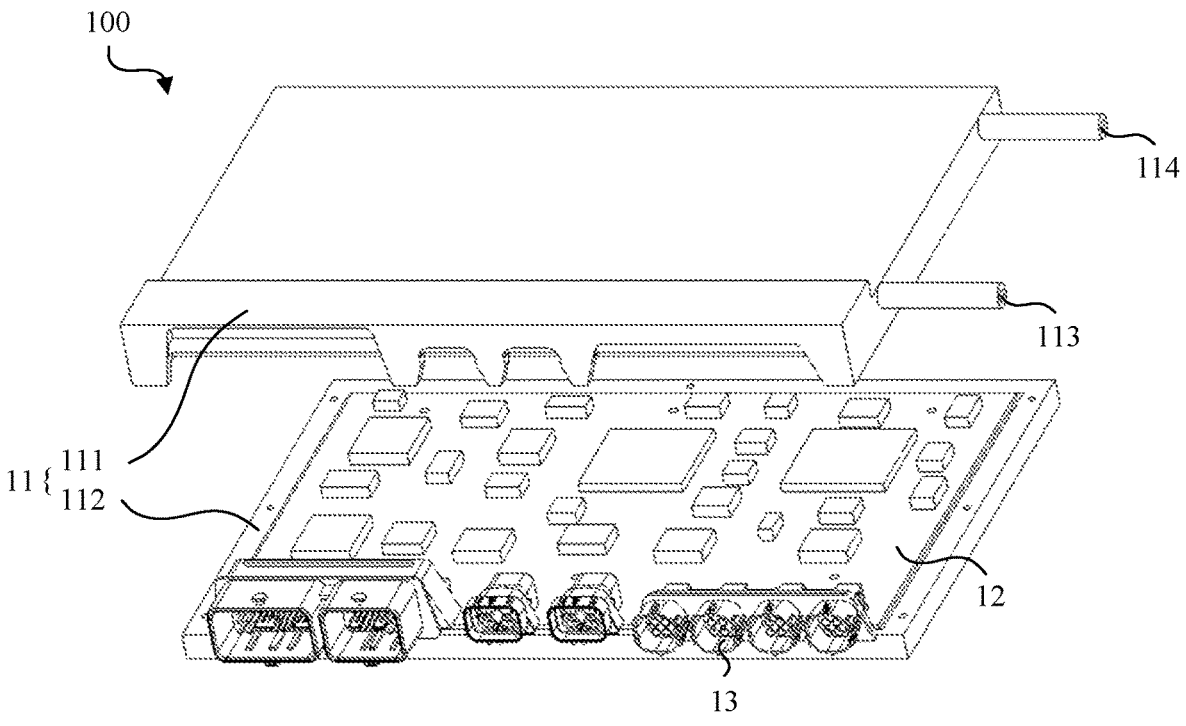
FIG. 4 is a schematic diagram of a structure of a vehicle-mounted device according to an embodiment of this application.

FIG. 3 is a schematic diagram of a device cooling system according to an embodiment of this application. FIG. 4 is a schematic diagram of a structure of a vehicle-mounted device according to an embodiment of this application. As shown in FIG. 3 and FIG. 4, this embodiment of this application provides the device cooling system. The device cooling system may include a vehicle-mounted device 100, a main controller (not shown in the figure), and a valve set. A liquid inlet pipe 113 and a liquid outlet pipe 114 are disposed on the vehicle-mounted device 100. The liquid inlet pipe 113 is connected to the valve set, the valve set is connected to an electric drive liquid-cooling loop to form a first path, and the valve set is connected to a battery liquid-cooling loop to form a second path. The valve set is configured to switch a switch status to control to connect the first path or the second path. The liquid outlet pipe 114 is connected to the electric drive liquid-cooling loop or the battery liquid-cooling loop.

The vehicle-mounted device 100 may include a housing 11 and a mainboard 12 disposed in the housing 11. The housing 11 may include an upper housing 111 and a lower housing 112. The upper housing 111 and the lower housing 112 may be connected by using a screw. A connector 13 may be sandwiched between the upper housing 111 and the lower housing 112, and the connector 13 is configured to connect to an external cable. The upper housing 111 may include a cold plate, and the liquid inlet pipe 113 and the liquid outlet pipe 114 are disposed on the cold plate. Coolant like water may enter the cold plate from the liquid inlet pipe 113, absorb heat, and then may be discharged from the liquid outlet pipe 14.

In this embodiment of this application, the valve set is disposed to connect the liquid inlet pipe 113 to the electric drive liquid-cooling loop and the battery liquid-cooling loop. The valve set is controlled to switch a switch, so that low-temperature cold water in the electric drive liquid-cooling loop or the battery liquid-cooling loop enters the vehicle-mounted device 100 from the liquid inlet pipe 113, and then is discharged from the liquid outlet pipe 114. In this way, the vehicle-mounted device 100 can be cooled by using a liquid-cooling system. This has high cooling efficiency, and can prevent a condensation phenomenon by controlling a liquid inlet temperature.

The liquid inlet temperature may be implemented by controlling the valve set. In this embodiment of this application, a temperature and humidity detection apparatus may be disposed in the vehicle-mounted device 100, and the main controller is separately connected to the temperature and humidity detection apparatus and the valve set. The main controller is configured to: obtain a dew point temperature based on a temperature and humidity that are detected by the temperature and humidity detection apparatus, and control, based on the dew point temperature, the valve set to switch the switch status, so that a temperature of the coolant like the water entering the vehicle-mounted device 100 is always higher than or equal to the dew point temperature of air inside the vehicle-mounted device 100. This can avoid the condensation phenomenon occurring in the vehicle-mounted device 100.

In this case, a method for controlling the device cooling system provided embodiments of this application may include the following steps.

The main controller obtains temperature information and humidity information that are detected by the temperature and humidity detection apparatus in the vehicle-mounted device 100, and calculates the dew point temperature based on the temperature information and the humidity information; determines whether the dew point temperature falls within a first interval or a second interval; and if the dew point temperature falls within the first interval, controls the valve set to switch the switch to open the first path; or if the dew point temperature falls within the second interval, controls the valve set to switch the switch to open the second path.

In a specific embodiment, a temperature of water in the battery liquid-cooling loop 400 may be lower than a temperature of water in the electric drive liquid-cooling loop 300. In this case, a temperature in the first interval is higher than a temperature in the second interval. When the dew point temperature falls within the second interval with a lower temperature, and temperatures of water in both the electric drive liquid-cooling loop 300 and the battery liquid-cooling loop 400 are higher than or equal to the dew point temperature, condensation does not occur when the vehicle-mounted device is connected to either of the electric drive liquid-cooling loop and the battery liquid-cooling loop. The vehicle-mounted device 100 may be connected to the battery liquid-cooling loop 400 with a lower temperature of water, to improve cooling efficiency. When the dew point temperature falls within the first interval with a higher temperature, the dew point temperature may be lower than or equal to the temperature of water in the electric drive liquid-cooling loop 300 and higher than the temperature of water in the battery liquid-cooling loop 400. In this case, the vehicle-mounted device 100 may be connected to the electric drive liquid-cooling loop 300 with a higher temperature of water, to avoid condensation.

It is known that the temperature of water in the electric drive liquid-cooling loop 300 is higher and is usually higher than 40° C., while the temperature of water in the battery liquid-cooling loop 400 is lower and is usually about 20° C. For example, the first interval may be set to 20° C. to 40° C., and the second interval may be set to 0° C. to 20° C.

Based on the foregoing embodiment, in this embodiment of this application, to accurately control the liquid inlet temperature, a temperature sensor may be disposed to detect temperatures of cooling water from the electric drive liquid-cooling loop and the battery liquid-cooling loop.

A first temperature sensor may be disposed between the electric drive liquid-cooling loop and the valve set, and a second temperature sensor may be disposed between the battery liquid-cooling loop and the valve set. The main controller is separately connected to the first temperature sensor and the second temperature sensor. The main controller is configured to: obtain a first temperature detected by the first temperature sensor and a second temperature detected by the second temperature sensor; compare the dew point temperature, the first temperature, and the second temperature; and when both the first temperature and the second temperature are higher than or equal to the dew point temperature, control to connect a path corresponding to a lower temperature in the first temperature and the second temperature; or when either of the first temperature and the second temperature is higher than or equal to the dew point temperature, control to connect a path corresponding to a higher temperature in the first temperature and the second temperature.

In this case, the method for controlling the device cooling system provided in this embodiment of this application may include the following steps.

The main controller obtains temperature information and humidity information that are detected by the temperature and humidity detection apparatus in the vehicle-mounted device, and calculates the dew point temperature based on the temperature information and the humidity information; obtains the first temperature detected by the first temperature sensor and the second temperature detected by the second temperature sensor; compares the dew point temperature, the first temperature, and the second temperature, to determine whether the dew point temperature falls within the first interval or the second interval; and if the dew point temperature falls within the first interval, controls the valve set to switch the switch to open the first path; or if the dew point temperature falls within the second interval, controls the valve set to switch the switch to open the second path.

The determining, based on the dew point temperature, the first temperature, and the second temperature, whether the dew point temperature falls within the first interval or the second interval includes: when the dew point temperature is lower than or equal to either of the first temperature and the second temperature, if the first temperature is higher than the second temperature, determining that the dew point temperature falls within the first interval; or if the first temperature is lower than the second temperature, determining that the dew point temperature falls within the second interval; or when the dew point temperature is lower than or equal to both the first temperature and the second temperature, if the first temperature is higher than the second temperature, determining that the dew point temperature falls within the second interval; or if the first temperature is lower than the second temperature, determining that the dew point temperature falls within the first interval.

It should be understood that, when both the first temperature and the second temperature are higher than or equal to the dew point temperature, the main controller controls to connect a path corresponding to a lower temperature in the first temperature and the second temperature, so that cooling efficiency can be improved while condensation is avoided; or when either of the first temperature and the second temperature is higher than or equal to the dew point temperature, the main controller controls to connect a path corresponding to a higher temperature in the first temperature and the second temperature, so that condensation can be avoided.

Still as shown in FIG. 3, in a possible implementation, the valve block may be a first three-way solenoid valve 200. The first three-way solenoid valve 200 includes an outlet A, a first inlet B, and a second inlet C. The liquid inlet pipe 113 is connected to the outlet A of the first three-way solenoid valve 200, the electric drive liquid-cooling loop 300 is connected to the first inlet B of the first three-way solenoid valve 200, and the battery liquid-cooling loop 400 is connected to the second inlet C of the first three-way solenoid valve 200. The main controller is connected to the first three-way solenoid valve 200, and the main controller may switch an inlet of the first three-way solenoid valve 200, so that the vehicle-mounted device 100 is connected to the electric drive liquid-cooling loop 300 or the battery liquid-cooling loop 400. When the first inlet B is opened, the first path is connected, and the electric drive liquid-cooling loop 300 inputs low-temperature cooling water to the vehicle-mounted device 100. When the second inlet C is opened, the second path is connected, and the battery liquid-cooling loop 400 inputs low-temperature cooling water to the vehicle-mounted device 100.

When the temperature of water in the battery liquid-cooling loop 400 is lower than the temperature of water in the electric drive liquid-cooling loop 300, control logic of the main controller may be simplified as follows: When both the first temperature and the second temperature are higher than or equal to the dew point temperature, the main controller controls the second inlet C of the first three-way solenoid valve 200 to open; or when the first temperature is higher than or equal to the dew point temperature, and the second temperature is lower than the dew point temperature, controls the first inlet B of the first three-way solenoid valve 200 to open.

Figure 5:
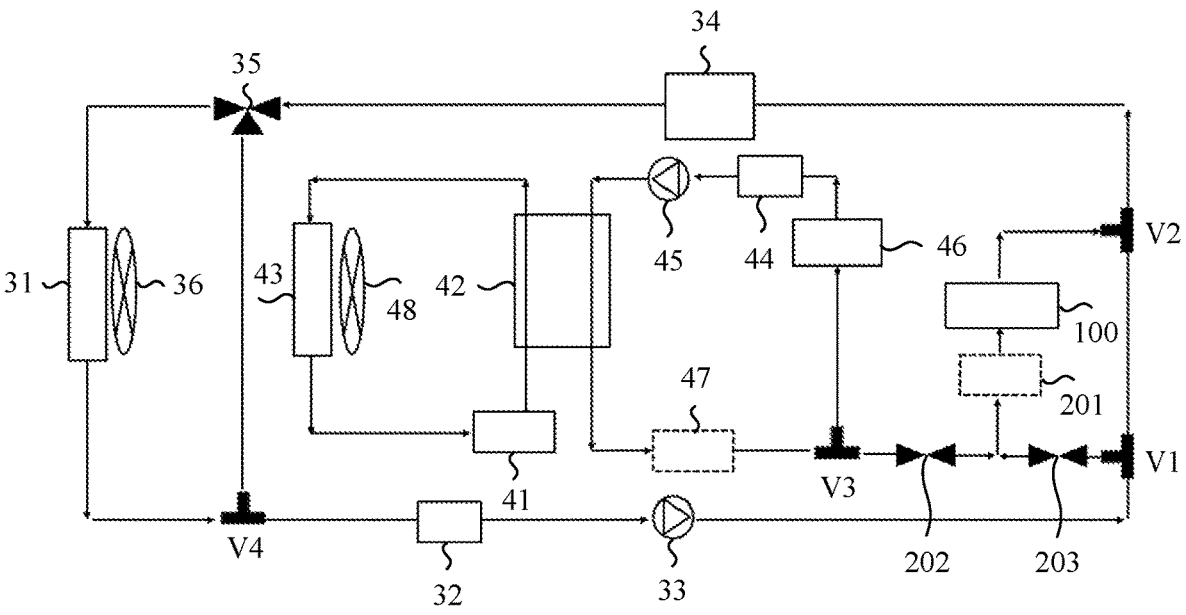
FIG. 5 is a schematic diagram of another structure of a device cooling system according to an embodiment of this application.

FIG. 5 is a schematic diagram of another structure of a device cooling system according to an embodiment of this application. As shown in FIG. 5, in another possible implementation, the valve set may include a first two-way solenoid valve 202 and a second two-way solenoid valve 203. The first two-way solenoid valve 202 is connected between the electric drive liquid-cooling loop and the liquid inlet pipe 113, and the second two-way solenoid valve 203 is connected between the battery liquid-cooling loop and the liquid inlet pipe 113.

The main controller is separately connected to the first two-way solenoid valve 202 and the second two-way solenoid valve 203. The main controller may control the first two-way solenoid valve 202 to open, so that the first path is connected, and the electric drive liquid-cooling loop 300 inputs low-temperature cooling water to the vehicle-mounted device 100. The main controller may control the second two-way solenoid valve 203 to open, so that the second path is connected, and the battery liquid-cooling loop 400 inputs low-temperature cooling water to the vehicle-mounted device 100.

Figure 6:
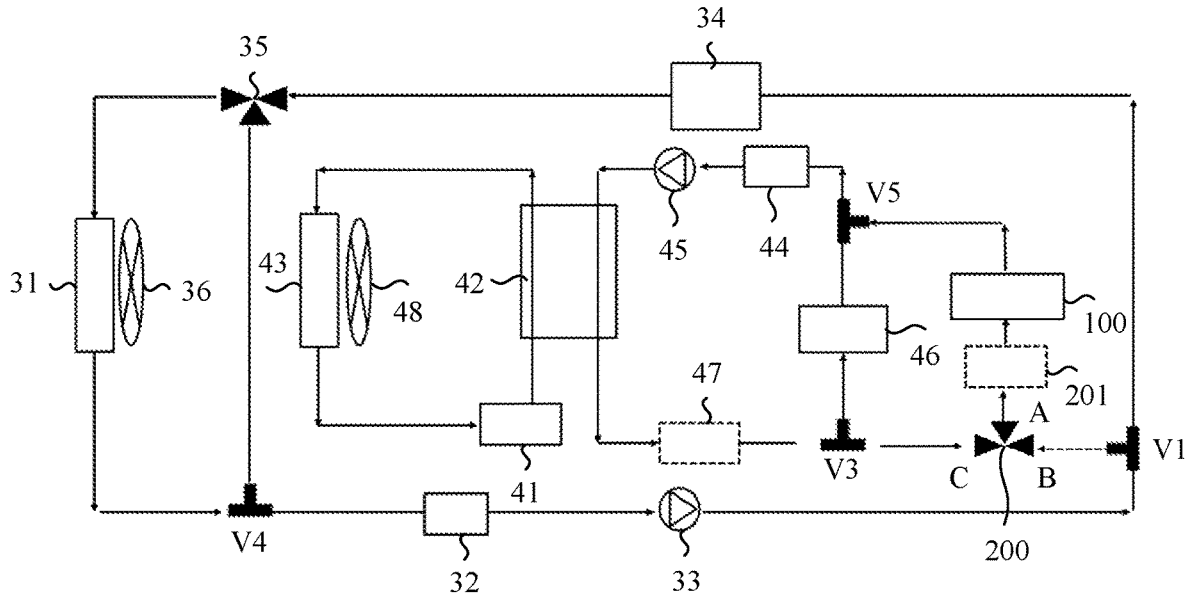
FIG. 6 is a schematic diagram of still another structure of a device cooling system according to an embodiment of this application.

Still as shown in FIG. 3, in a possible implementation, the liquid outlet pipe 114 of the vehicle-mounted device 100 may be connected to the electric drive liquid-cooling loop 300. FIG. 6 is a schematic diagram of yet another structure of a device cooling system according to an embodiment of this application. As shown in FIG. 6, in another possible implementation, the liquid outlet pipe 114 of the vehicle-mounted device 100 may be connected to the battery liquid-cooling loop 400.

It should be understood that, because coolant in the electric drive liquid-cooling loop 300 and coolant in the battery liquid-cooling loop 400 are the same, and both may be water. In addition, a flow rate of coolant required by the vehicle-mounted device 100 is far less than a flow rate of the coolant in each of the electric drive liquid-cooling loop 300 and the battery liquid-cooling loop 400. Therefore, regardless of which one of the first path or the second path is connected to the liquid inlet pipe 113, after the coolant flows out of the vehicle-mounted device 100, impact of the coolant entering the electric drive liquid-cooling loop 300 or the battery liquid-cooling loop 400 on respective cooling effects of the two loops may be ignored.

Figure 7:
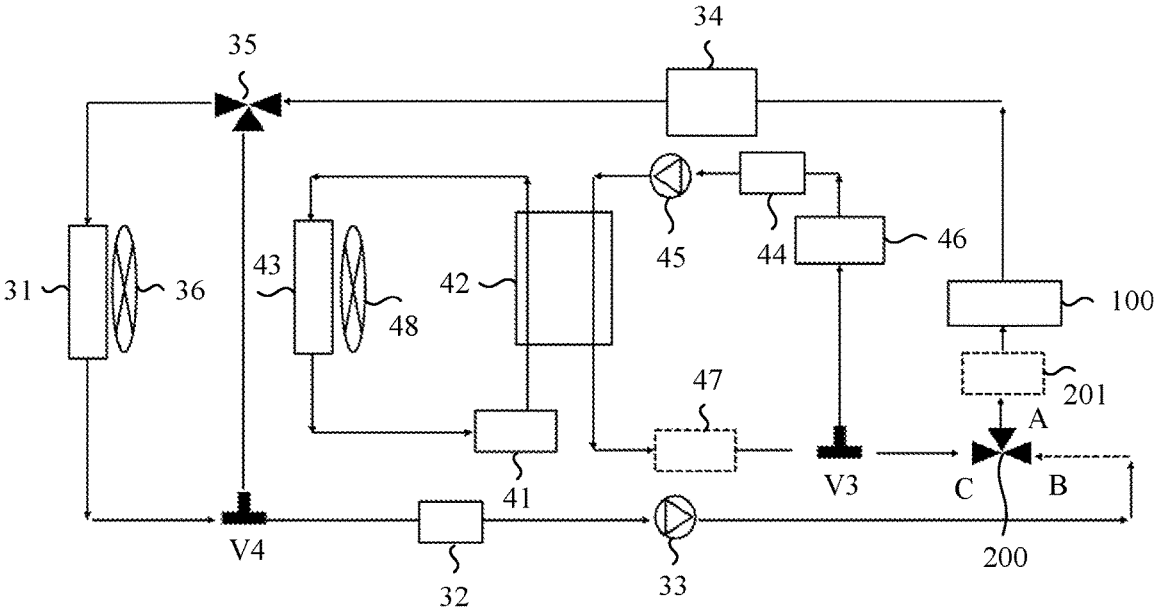
FIG. 7 is a schematic diagram of yet still another structure of a device cooling system according to an embodiment of this application.

FIG. 7 is a schematic diagram of yet still another structure of a device cooling system according to an embodiment of this application. As shown in FIG. 7, in a possible implementation, a liquid inlet side of the vehicle-mounted device 100 may be directly connected to the electric drive liquid-cooling loop 300 through the first inlet B of the first three-way solenoid valve 200. The vehicle-mounted device 100 may be connected to the battery liquid-cooling loop 400 through the second inlet C of the first three-way solenoid valve 200 and a three-way valve V3. A liquid outlet side of the vehicle-mounted device 100 may be directly connected to the electric drive liquid-cooling loop 300, which is equivalent to that the vehicle-mounted device 100 is directly connected in series to the electric drive liquid-cooling loop 300. In addition, another branch is implemented on the liquid inlet side through the first three-way solenoid valve 200.

In this embodiment of this application, a connection between the valve set and each of the electric drive liquid-cooling loop 300 and the battery liquid-cooling loop 400 may be implemented through a three-way valve. A connection between the liquid outlet pipe of the vehicle-mounted device 100 and the electric drive liquid-cooling loop 300 or the battery liquid-cooling loop 400 may also be implemented through a three-way valve.

As shown in FIG. 3 and FIG. 5, three-way valves V1 and V2 may be disposed in the electric drive liquid-cooling loop 300, and the three-way valve V1 is located upstream of the three-way valve V2. Coolant enters from an inlet of the three-way valve V1, one outlet of the three-way valve V1 is directly connected to one inlet of the three-way valve V2, the other outlet of the three-way valve V1 is connected to the valve set, the other inlet of the three-way valve V2 is connected to the liquid outlet pipe 114, and the coolant flows out of the outlet of the three-way valve V2. The three-way valves V1 and V2 are disposed, so that branch circulation is added to the electric drive liquid-cooling loop 300 without affecting main circulation. In this way, a small part of the coolant enters the vehicle-mounted device 100.

The three-way valve V3 may be disposed in the battery liquid-cooling loop 400. The coolant enters from an inlet of the three-way valve V3, a part of the coolant flows out of one outlet of the three-way valve V3, to be used as main circulation of the battery liquid-cooling loop 400. The other part of the coolant is connected to the valve set through the other outlet of the three-way valve V3, to enter the vehicle-mounted device 100. According to a same principle, in FIG. 6, the liquid outlet pipe 114 may flow back to the battery liquid-cooling loop 400 through a three-way valve V5.

Bypass branches are added to the electric drive liquid-cooling loop 300 and the battery liquid-cooling loop 400 by disposing the three-way valves, so that a part of the coolant can be diverted into the vehicle-mounted device 100 to cool the vehicle-mounted device 100. Compared with the solution in which the vehicle-mounted device 100 is directly connected in series to the electric drive liquid-cooling loop 30 or the battery liquid-cooling loop 400, according to this solution, a flow rate and a flow speed of the coolant entering the vehicle-mounted device 100 can be controlled. This prevents corrosion of the vehicle-mounted device 100 caused by scouring of the coolant with a high flow rate and a high flow speed.

Based on the foregoing embodiment, as shown in FIG. 3 and FIG. 5 to FIG. 7, in this embodiment of this application, the device cooling system further includes a first heater 201. The first heater 201 is connected between the first three-way solenoid valve 200 and the liquid inlet pipe 113, and the main controller is connected to the first heater 201. The main controller is configured to: when both the first temperature and the second temperature are lower than the dew point temperature, control the first heater 201 to be turned on. The first heater 201 may be, for example, a positive temperature efficiency (PTC) heater.

In this case, the method for controlling the device cooling system provided in this embodiment of this application may further include: The main controller determines whether the dew point temperature falls within a third interval; and if the dew point temperature falls within the third interval, controls the first heater to be turned on. The determining whether the dew point temperature falls within the third interval includes: comparing the dew point temperature, the first temperature, and the second temperature; and if the dew point temperature is higher than both the first temperature and the second temperature, determining that the dew point temperature falls within the third interval.

When both the first temperature and the second temperature are lower than the dew point temperature, condensation occurs when the vehicle-mounted device 100 is connected to the battery liquid-cooling loop 400 or the electric drive liquid-cooling loop 300. The first heater 201 is disposed to heat water with a low temperature from the battery liquid-cooling loop 400 or the electric drive liquid-cooling loop 300. In this way, a temperature of water entering the vehicle-mounted device 100 is higher than or equal to the dew point temperature, so that a condensation phenomenon can be avoided.

In addition, the device cooling system may further include a third temperature sensor. The third temperature sensor may be connected between the first heater 201 and the liquid inlet pipe 113, and the main controller is connected to the third temperature sensor. The main controller is configured to: obtain a third temperature detected by the third temperature sensor, and control the first heater 201 to be turned on, so that the third temperature is not lower than the dew point temperature.

The third temperature sensor is disposed, so that temperature of the water entering the vehicle-mounted device 100 may be monitored in real time. This ensures that the temperature of the water entering the vehicle-mounted device 100 is higher than or equal to the dew point temperature, and avoids affecting cooling efficiency and working reliability of the vehicle-mounted device 100 due to an excessively high temperature of water caused by excessive heating power of the first heater 201.

In the foregoing embodiment of this application, the electric drive liquid-cooling loop 300 may include a radiator 31, a first tank 32, a first water pump 33, and a powertrain 34 that are sequentially connected through a pipeline. The valve set may be connected between the first water pump 33 and the powertrain 34, so that the coolant entering the vehicle-mounted device 100 is in a low temperature state.

The valve set, the first water pump 33, and the powertrain 34 may be connected through the three-way valve V1, and the first water pump 33 is connected to the inlet of the three-way valve V1. Heat generated by both the powertrain 34 and the vehicle-mounted device 100 is taken away by the coolant, and is dissipated at the radiator 31. A first fan 36 may be further disposed near the radiator 31, to improve heat dissipation efficiency of the radiator 31.

When the liquid outlet pipe 114 of the vehicle-mounted device 100 is connected to the electric drive liquid-cooling loop 300, the liquid outlet pipe 114 may be connected between the powertrain 34 and the radiator 31, or may be connected between the first water pump 33 and the powertrain 34. A connection location of the liquid outlet pipe 114 is downstream of a connection location of the valve set. Therefore, after entering the vehicle-mounted device 100, the low-temperature coolant flows back to the electric drive liquid-cooling loop 300, and is cooled at the radiator 31.

The electric drive liquid-cooling loop 300 may further include a second three-way solenoid valve 35. An inlet of the second three-way solenoid valve 35 is connected to the powertrain 34, and two outlets of the second three-way solenoid valve 35 are respectively connected to the radiator 31 and the first tank 32. When heat generated by the powertrain 34 is low, a heat dissipation requirement can be met only through coolant circulation, and energy consumption can be reduced. In this case, an outlet that is of the second three-way solenoid valve 35 and that is connected to the radiator 31 may be closed, and an outlet that is of the second three-way solenoid valve 35 and that is connected to the first tank 32 may be opened.

In the foregoing embodiment of this application, the battery liquid-cooling loop 400 may include a compressor 41, a heat exchanger 42, a condenser 43, a second tank 44, a second water pump 45, and a battery pack 46. The compressor 41, the heat exchanger 42, and the condenser 43 may be sequentially connected through a pipeline to form a refrigerant loop. The second tank 44, the second water pump 45, the heat exchanger 42, and the battery pack 46 may be sequentially connected through a pipeline to form a coolant loop. Heat generated by the battery pack 46 may be taken away by the coolant like water, the heat is exchanged at the heat exchanger 42, and refrigerant is condensed at the condenser 43 for heat dissipation. A second fan 48 may be disposed near the condenser 43, to improve heat dissipation efficiency of the condenser 43.

The valve set may be connected between the heat exchanger 42 and the battery pack 46, so that the coolant entering the vehicle-mounted device 100 is in a low temperature state. The valve set, the heat exchanger 42, and the battery pack 46 may be connected through the three-way valve V3, and the heat exchanger 42 is connected to the inlet of the three-way valve V3. When the liquid outlet pipe 114 of the vehicle-mounted device 100 is connected to the battery liquid-cooling loop 400, the liquid outlet pipe 114 may be connected between the heat exchanger 42 and the battery pack 46 and located downstream of the connection location of the valve set, or may be connected between the battery pack 46 and the water pump 45, or may be connected between the water pump 45 and the heat exchanger 42. In this way, after entering the vehicle-mounted device 100, the low-temperature coolant flows back to the battery liquid-cooling loop 400, and is cooled at the heat exchanger 42.

In this embodiment of this application, as shown in FIG. 3 and FIG. 6, the liquid outlet pipe 114 is connected to the electric drive liquid-cooling loop 300 or the battery liquid-cooling loop 400. Compared with the solution in which the three-way valve is disposed, according to the solution in which the liquid outlet pipe 114 is simultaneously connected to the electric drive liquid-cooling loop 300 and the battery liquid-cooling loop 400, a pipeline design is simplified.

Further, a circulation medium in the refrigerant loop includes, but is not limited to refrigerant such as R134a refrigerant, R744 (carbon dioxide), R718 (water), R290 (propane), R717 (ammonia), R410a, R32, R1234yf, R502, R12, R22, R407c, or R600a, or a combination of any two or more of these refrigerants. A circulation medium in the coolant loop includes, but is not limited to, water, antifreeze, or ethylene glycol.

In addition, the battery liquid-cooling loop 400 may further include a second heater 47. The second heater 47 may be connected between the heat exchanger 42 and the battery pack 46, and the valve set may be connected between the second heater 47 and the battery pack 46. The second heater 47 is configured to heat the coolant, to heat the battery pack 46 when a temperature is low in winter, to prevent the low temperature from affecting working of the battery pack 46.

The second heater 47 may be set to a PTC heater. It should be understood that a turn-on time period of the second heater 47 is winter when a temperature is low, and the first heater 201 is turned on when an ambient temperature is high. In addition, heating power of the second heater 47 is far greater than heating power of the first heater 201. Therefore, the second heater 47 cannot replace the first heater 201 in terms of a function.

In the foregoing embodiment of this application, it should be noted that, in addition to a domain controller (which may also be referred to as a vehicle-mounted mobile data center MDC), the vehicle-mounted device 100 to which the device cooling system is applied may be a device like an on-board charger or an electronic control unit ECU.

It should be understood that, for the device cooling system, there may be one, two, or even a plurality of vehicle-mounted devices 100. In embodiments provided in the foregoing accompanying drawings, there is one vehicle-mounted device 100. However, in a case in which there are a plurality of vehicle-mounted devices 100, each vehicle-mounted device 100 may be connected to an electric drive liquid-cooling loop and a battery liquid-cooling loop by disposing the valve set, or a plurality of vehicle-mounted devices 100 may be directly connected in series, and considered as a whole. The whole is connected to the electric drive liquid-cooling loop and the battery liquid-cooling loop by disposing only one valve set, so that a pipeline is simplified.

In addition, it should be additionally noted that a type and a location of the main controller configured to control the device cooling system are not specifically limited in embodiments of this application. The main controller may be a controller included in the vehicle-mounted device 100, or may be a vehicle control unit (VCU).

Figure 8:
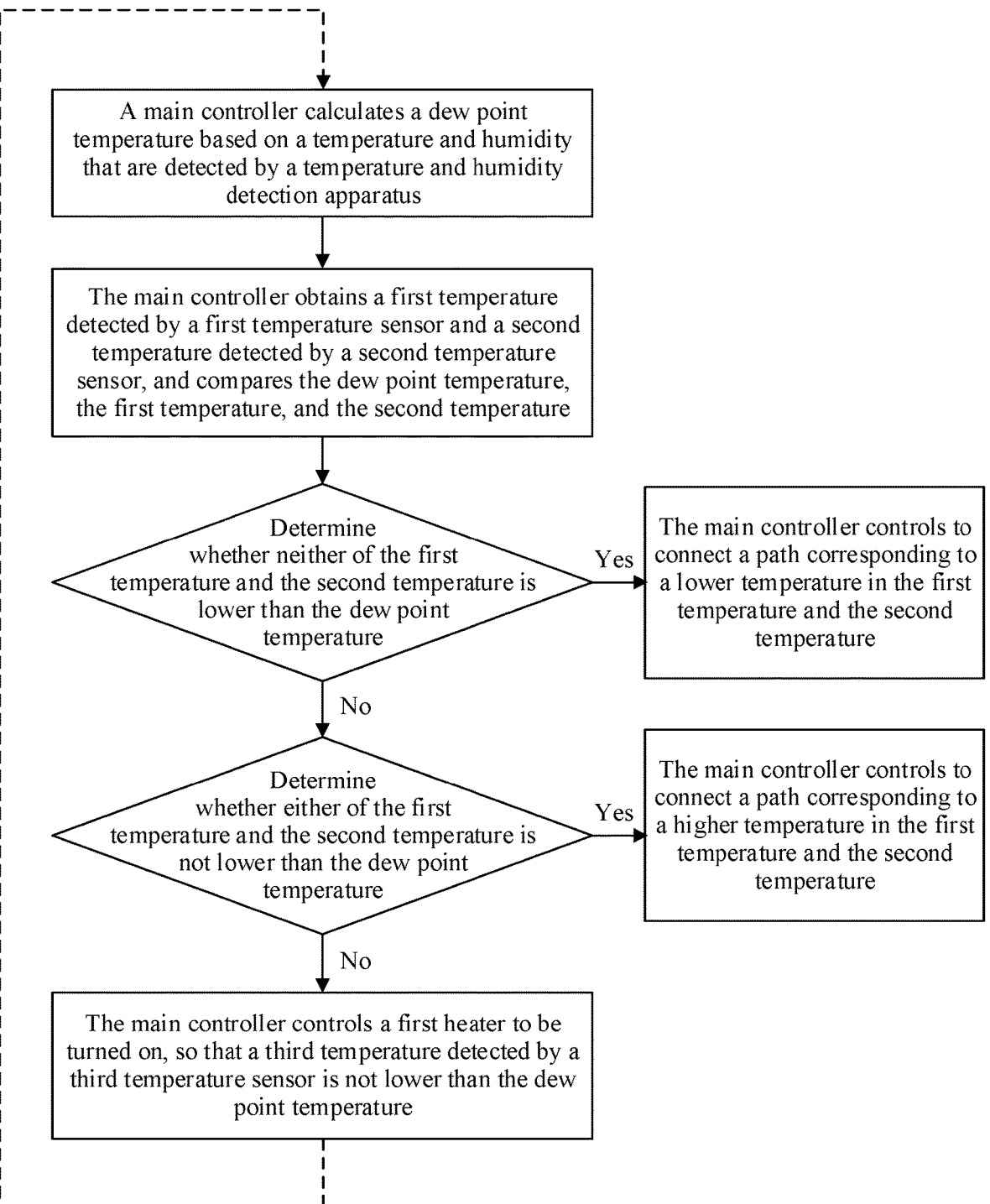
FIG. 8 is a working flowchart of a main controller in a device cooling system according to an embodiment of this application.

FIG. 8 is a working flowchart of the main controller in the device cooling system according to an embodiment of this application. As shown in FIG. 8, an example working procedure of the main controller in the device cooling system provided in this embodiment of this application may be as follows: First, the main controller calculates a dew point temperature of the vehicle-mounted device 100 based on a temperature and humidity that are detected by a temperature and humidity detection apparatus; obtains a first temperature detected by a first temperature sensor and a second temperature detected by a second temperature sensor, and compares the dew point temperature, the first temperature, and the second temperature; and then determines whether both the first temperature and the second temperature are higher than or equal to the dew point temperature. When a determining result is that both the first temperature and the second temperature are higher than or equal to the dew point temperature, the main controller controls to connect a path corresponding to a lower temperature in the first temperature and the second temperature; or when a determining result is that not both the first temperature and the second temperature are higher than or equal to the dew point temperature, the main controller continues to determine whether either of the first temperature and the second temperature is higher than or equal to the dew point temperature. When a determining result is that either of the first temperature and the second temperature is higher than or equal to the dew point temperature, the main controller controls to connect a path corresponding to a higher temperature in the first temperature and the second temperature; or when a determining result is that neither of the first temperature and the second temperature is higher than or equal to the dew point temperature, the main controller controls the first heater 201 to be turned on, so that a third temperature detected by a third temperature sensor is higher than or equal to the dew point temperature.

In general, the main controller may control, based on a relationship between the first temperature, the second temperature, and the dew point temperature, the vehicle-mounted device 100 to be connected to the battery liquid-cooling loop 400 or to be connected to the electric drive liquid-cooling loop 300, or control the first heater 201 to be turned on. In this way, a temperature of water entering the vehicle-mounted device 100 is always higher than or equal to the dew point temperature, so that a condensation phenomenon can be avoided.

According to the device cooling system provided in this embodiment of this application, the temperature and humidity detection apparatus is disposed in the vehicle-mounted device to obtain the dew point temperature of air inside the vehicle-mounted device, the vehicle-mounted device is connected to the electric drive liquid-cooling loop and the battery liquid-cooling loop by using the valve set, and the valve set switches a switch to enable the vehicle-mounted device to be connected to the electric drive liquid-cooling loop or the battery liquid-cooling loop. In this way, a temperature of the coolant entering the vehicle-mounted device is always higher than or equal to the dew point temperature of the air inside the vehicle-mounted device. This can avoid a condensation phenomenon occurring in the vehicle-mounted device, effectively prevent reliability and safety problems caused by corrosion and a short circuit that occur in the vehicle-mounted device, and improve working stability and reliability of a product. In addition, the vehicle-mounted device can always be at a minimum working temperature on a premise that an anti-condensation condition is met. This can improve reliability of the vehicle-mounted device, and reduce a failure rate.

Embodiments of this application further provide a thermal management system. The thermal management system may include the electric drive liquid-cooling loop, the battery liquid-cooling loop, and the device cooling system provided in the foregoing embodiments.

In the thermal management system in embodiments of this application, the electric drive liquid-cooling loop and the battery liquid-cooling loop are disposed to respectively cool two main heat generation devices: a powertrain and a battery pack. In addition, a vehicle-mounted device may be connected to the electric drive liquid-cooling loop or the battery liquid-cooling loop under control of a main controller. In this way, liquid-cooling of the vehicle-mounted device can be implemented, and a condensation phenomenon in the vehicle-mounted device can be avoided.

The device cooling system provided in the foregoing embodiments of this application is applied to a vehicle thermal management system, and cools the vehicle-mounted device by using the electric drive liquid-cooling loop and the battery liquid-cooling loop. In addition, an embodiment of this application may further provide a device cooling system that may be applied to the fields such as a power system and a data center.

Figure 9:
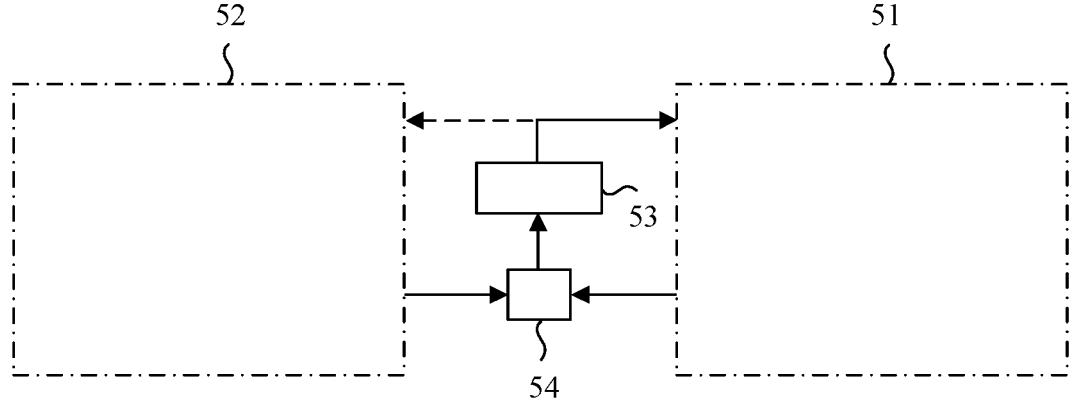
FIG. 9 is another schematic diagram of a device cooling system according to an embodiment of this application.

FIG. 9 is another schematic diagram of the device cooling system according to an embodiment of this application. As shown in FIG. 9, this embodiment of this application further provides the device cooling system that may be applied to a thermal management system including two or more liquid-cooling loops. The thermal management system may include a first liquid-cooling loop 51 and a second liquid-cooling loop 52. A cooling temperature of coolant in the first liquid-cooling loop 51 is higher than a cooling temperature of coolant in the second liquid-cooling loop 52. The device cooling system may include a to-be-cooled device 53, a main controller, and a valve set 54. A liquid inlet pipe of the to-be-cooled device 53 is connected to the valve set 54, the valve set 54 is connected to the first liquid-cooling loop 51 to form a first path, and the valve set 54 is connected to the second liquid-cooling loop 52 to form a second path. The valve set 54 is configured to switch a switch status to control to connect the first path or the second path. A liquid outlet pipe of the to-be-cooled device 53 is connected to the first liquid-cooling loop and the second liquid-cooling loop. A temperature and humidity detection apparatus is disposed in the to-be-cooled device 53, and the main controller is separately connected to the temperature and humidity detection apparatus and the valve set 54. The main controller is configured to: obtain a dew point temperature based on a temperature and humidity that are detected by the temperature and humidity detection apparatus, and control, based on the dew point temperature, the valve set 54 to switch the switch status.

For example, the device cooling system is applied to a power system. The first liquid-cooling loop 51 and the second liquid-cooling loop 52 may be liquid-cooling loops connected to large electrical devices such as an energy storage battery or a transformer, and the to-be-cooled device 53 may be a small device like a domain controller in the power system.

For example, the device cooling system is applied to a data center. The first liquid-cooling loop 51 and the second liquid-cooling loop 52 may be used to respectively cool servers in different equipment rooms or in different areas, to meet different cooling requirements of different servers. The to-be-cooled device 53 may be a data center monitoring equipment room or the like.

In the disposed device cooling system, the temperature and humidity detection apparatus is disposed in the to-be-cooled device to obtain the dew point temperature of air inside the to-be-cooled device, the to-be-cooled device is connected to the first liquid-cooling loop and the second liquid-cooling loop by using the valve set, and the valve set switches a switch to enable the to-be-cooled device to be connected to the first liquid-cooling loop or the second liquid-cooling loop. In this way, a temperature of coolant entering the to-be-cooled device is always higher than or equal to the dew point temperature of the air inside the to-cooled device. This can avoid a condensation phenomenon occurring in the to-be-cooled device, effectively prevent reliability and safety problems caused by corrosion and a short circuit that occur in the to-be-cooled device, and improve overall stability and reliability of the system.

In descriptions of embodiments of this application, it should be noted that, unless otherwise clearly specified and limited, the terms "installation", "interconnection", and "connection" should be understood in a broad sense. For example, the "connection" may be a fixed connection, may be an indirect connection through an intermediate medium, or may be communication inside two elements or an interaction relationship between two elements. Persons of ordinary skill in the art may understand specific meanings of the foregoing terms in embodiments of this application based on specific cases.

In the specification, the terms "first", "second", "third", "fourth", and the like (if existent) in embodiments of this application are intended to distinguish between similar objects, but do not necessarily indicate a specific order or sequence.

In addition, the terms "include" and "have" and any other variants thereof are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Finally, it should be noted that the foregoing embodiments are merely intended for describing the technical solutions in embodiments of this application other than limiting embodiments of this application. Although embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in embodiments of this application.

What is claimed is:

1. A device cooling system, comprised in a thermal management system, wherein the thermal management system further comprises an electric drive liquid-cooling loop and a battery liquid-cooling loop, wherein the device cooling system comprises a vehicle-mounted device, a main controller, and a valve set, wherein the vehicle-mounted device comprises a liquid inlet pipe connected to the valve set and a liquid outlet pipe connected to the electric drive liquid-cooling loop or the battery liquid-cooling loop;

the valve set is connected to the electric drive liquid-cooling loop to form a first path, the valve set is connected to the battery liquid-cooling loop to form a second path, the valve set is configured to switch a switch status to control to connect the first path or the second path; and the main controller is separately connected to the vehicle-mounted device and the valve set, and the main controller is configured to: obtain a dew point temperature based on a temperature and humidity that are detected by the vehicle-mounted device, and control, based on the dew point temperature, the valve set to switch the switch status.

2. The device cooling system of claim 1, wherein a first temperature sensor is disposed between the electric drive liquid-cooling loop and the valve set, and a second temperature sensor is disposed between the battery liquid-cooling loop and the valve set; and the main controller is separately connected to the first temperature sensor and the second temperature sensor, and the main controller is configured to: obtain a first temperature detected by the first temperature sensor and a second temperature detected by the second temperature sensor; compare the dew point temperature, the first temperature, and the second temperature; and when both the first temperature and the second temperature are higher than or equal to the dew point temperature, control to connect a path corresponding to a lower temperature in the first temperature and the second temperature; or when either of the first temperature and the second temperature is higher than or equal to the dew point temperature, control to connect a path corresponding to a higher temperature in the first temperature and the second temperature.

3. The device cooling system of claim 2, wherein the device cooling system further comprises a first heater connected between the valve set and the liquid inlet pipe, wherein the main controller is connected to the first heater and is configured to: when both the first temperature and the second temperature are lower than the dew point temperature, control the first heater to be turned on.

4. The device cooling system of claim 3, wherein the device cooling system further comprises a third temperature sensor connected between the first heater and the liquid inlet pipe, wherein the main controller is connected to the third temperature sensor and is configured to: obtain a third temperature detected by the third temperature sensor, and control the first heater to be turned on, so that the third temperature is not lower than the dew point temperature.

5. The device cooling system of claim 1, wherein the valve set comprises a first three-way solenoid valve, the liquid inlet pipe is connected to an outlet of the first three-way solenoid valve, the electric drive liquid-cooling loop is connected to a first inlet of the first three-way solenoid valve, and the battery liquid-cooling loop is connected to a second inlet of the first three-way solenoid valve.

6. The device cooling system of claim 1, wherein the valve set comprises a first two-way solenoid valve and a second two-way solenoid valve, the first two-way solenoid valve is connected between the electric drive liquid-cooling loop and the liquid inlet pipe, and the second two-way solenoid valve is connected between the battery liquid-cooling loop and the liquid inlet pipe.

7. The device cooling system of claim 1, wherein the vehicle-mounted device comprises a housing and a mainboard disposed in the housing, the housing comprises a cold plate, and the liquid inlet pipe and the liquid outlet pipe are disposed on the cold plate.

8. The device cooling system of claim 1, wherein the electric drive liquid-cooling loop comprises a radiator, a first tank, a first water pump, and a powertrain that sequentially communicate through a pipeline, and the valve set is connected between the first water pump and the powertrain.

9. The device cooling system of claim 8, wherein the electric drive liquid-cooling loop further comprises a second three-way solenoid valve, an inlet of the second three-way solenoid valve is connected to the powertrain, and two outlets of the second three-way solenoid valve are respectively connected to the radiator and the first tank.

10. The device cooling system of claim 1, wherein the battery liquid-cooling loop comprises a compressor, a heat exchanger, a condenser, a second tank, a second water pump, and a battery pack, the compressor, the heat exchanger, and the condenser sequentially communicate through a pipeline to form a refrigerant loop, the second tank, the second water pump, the heat exchanger, and the battery pack sequentially communicate through a pipeline to form a coolant loop, and the valve set is connected between the heat exchanger and the battery pack.

11. The device cooling system of claim 10, wherein the battery liquid-cooling loop further comprises a second heater, the second heater is connected between the heat exchanger and the battery pack, and the valve set is connected between the second heater and the battery pack.

12. The device cooling system of claim 1, wherein the vehicle-mounted device comprises a domain controller, an on-board charger, or an electronic control unit (ECU).

13. The device cooling system of claim 1, wherein the main controller is a vehicle control unit (VCU) or a controller in the vehicle-mounted device.

14. A thermal management system, comprising an electric drive liquid-cooling loop, a battery liquid-cooling loop, and a device cooling system, wherein the device cooling system comprises a vehicle-mounted device, a main controller, and a valve set; wherein the vehicle-mounted device comprises a liquid inlet pipe connected to the valve set and a liquid outlet pipe connected to the electric drive liquid-cooling loop or the battery liquid-cooling loop;

the valve set is connected to the electric drive liquid-cooling loop to form a first path, the valve set is connected to the battery liquid-cooling loop to form a second path, the valve set is configured to switch a switch status to control to connect the first path or the second path; and the main controller is separately connected to the vehicle-mounted device and the valve set and is configured to: obtain a dew point temperature based on a temperature and humidity that are detected by the vehicle-mounted device, and control, based on the dew point temperature, the valve set to switch the switch status.

15. The thermal management system of claim 14, wherein a first temperature sensor is disposed between the electric drive liquid-cooling loop and the valve set, and a second temperature sensor is disposed between the battery liquid-cooling loop and the valve set; and the main controller is separately connected to the first temperature sensor and the second temperature sensor, and is configured to: obtain a first temperature detected by the first temperature sensor and a second temperature detected by the second temperature sensor; compare the dew point temperature, the first temperature, and the second temperature; and when both the first temperature and the second temperature are higher than or equal to the dew point temperature, control to connect a path corresponding to a lower temperature in the first temperature and the second temperature; or when either of the first temperature and the second temperature is higher than or equal to the dew point temperature, control to connect a path corresponding to a higher temperature in the first temperature and the second temperature.

16. The thermal management system of claim 15, wherein the device cooling system further comprises a first heater connected between the valve set and the liquid inlet pipe, wherein the main controller is connected to the first heater and is configured to: when both the first temperature and the second temperature are lower than the dew point temperature, control the first heater to be turned on.

17. A method for controlling a device cooling system, comprising:

obtaining temperature information and humidity information that are detected by a vehicle-mounted device;

calculating a dew point temperature based on the temperature information and the humidity information;

determining whether the dew point temperature falls within a first interval or a second interval; and if the dew point temperature falls within the first interval, controlling a valve set to switch a switch to open a first path, wherein the first path connects the vehicle-mounted device with an electric drive liquid-cooling loop; or if the dew point temperature falls within the second interval, controlling a valve set to switch a switch to open a second path, wherein the second path connects the vehicle-mounted device with a battery liquid-cooling loop.

18. The method of claim 17, wherein the determining whether the dew point temperature falls within the first interval or the second interval comprises:

obtaining a first temperature detected by a first temperature sensor and a second temperature detected by a second temperature sensor, wherein the first temperature is a liquid inlet temperature of the first path, and the second temperature is a liquid inlet temperature of the second path;

comparing the dew point temperature, the first temperature, and the second temperature; and when the dew point temperature is lower than or equal to either of the first temperature and the second temperature, if the first temperature is higher than the second temperature, determining that the dew point temperature falls within the first interval; or if the first temperature is lower than the second temperature, determining that the dew point temperature falls within the second interval; or when the dew point temperature is lower than or equal to both the first temperature and the second temperature, if the first temperature is higher than the second temperature, determining that the dew point temperature falls within the second interval; or if the first temperature is lower than the second temperature, determining that the dew point temperature falls within the first interval.

19. The method of claim 18, further comprising: determining whether the dew point temperature falls within a third interval, and if the dew point temperature falls within the third interval, controlling a first heater to be turned on, wherein the first heater is disposed between the valve set and the vehicle-mounted device.

20. The method of claim 19, wherein the determining whether the dew point temperature falls within the third interval comprises:

comparing the dew point temperature, the first temperature, and the second temperature, and if the dew point temperature is higher than both the first temperature and the second temperature, determining that the dew point temperature falls within the third interval.

* * * * *